US007200862B2

(12) United States Patent
Murching et al.

(10) Patent No.: US 7,200,862 B2
(45) Date of Patent: Apr. 3, 2007

(54) SECURING UNIFORM RESOURCE IDENTIFIER NAMESPACES

(75) Inventors: Arvind M. Murching, Issaquah, WA (US); Henry L. Sanders, Kirkland, WA (US); Eric B. Stenson, Redmond, WA (US); Shivakumar Seetharaman, Bellevue, WA (US); Rajesh Sundaram, Redmond, WA (US); Anish V. Desai, Bellevue, WA (US); George V. Reilly, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 844 days.

(21) Appl. No.: 10/260,479

(22) Filed: Sep. 30, 2002

(65) Prior Publication Data

US 2004/0064721 A1    Apr. 1, 2004

(51) Int. Cl.
*H04L 9/32* (2006.01)
(52) U.S. Cl. .................. 726/3; 709/224; 715/736
(58) Field of Classification Search ........ 709/223–224, 709/217, 218; 715/736; 707/3, 9, 102, 103 X–103 Z; 705/404; 726/3
See application file for complete search history.

(56) References Cited

U.S. PATENT DOCUMENTS

| | | | | |
|---|---|---|---|---|
| 6,151,624 | A * | 11/2000 | Teare et al. ............. | 709/217 |
| 6,185,614 | B1 * | 2/2001 | Cuomo et al. ........... | 709/224 |
| 6,574,655 | B1 * | 6/2003 | Libert et al. ............ | 709/200 |
| 2003/0149600 | A1 * | 8/2003 | Williams ................. | 705/5 |

OTHER PUBLICATIONS

Web Services Addressing 1.0—WSDL Binding, Martin Gudgin, Microsoft Corp; Marc Hadley, Sun Microsystems, Inc; Tony Rogers, Computer Associates International, Inc; Umit Yalcinalp, SAP AG; May 4, 2006.*
Namespaces in XML, World Wide Web Consortium Working Draft Sep. 16, 1998; Tim Bray (Textuality); Dave Hollander (Hewlett-Packard Company); Andrew Layman (Microsoft).*
Making Inodes Behave, C.J. Claiborne Jr., Linux Journal, Publ. by SSC Inc, USA, Feb. 2001, No. 82, pp. 94-99.
Permissions and Access Control Lists, W. LeFebvre, UNIX Review's Performance Computing, Publ. by Miller Freeman, USA, Oct. 1998, vol. 16, No. 11 pp. 59-61.

* cited by examiner

Primary Examiner—Kim Vu
Assistant Examiner—T. B. Truong
(74) Attorney, Agent, or Firm—Workman Nydegger

(57) ABSTRACT

A namespace management module utilizes a persistent reservation store that associates URI namespaces with one or more permissions. The reservation store can contain a number of reservation entries that each include a URI identifying a URI namespace and a corresponding Access Control List ("ACLs") that includes permissions for the identified URI namespace. When a request to register a URI namespace is received, the permissions of an appropriate ACL can be checked to determine if the registration is approved. When a resource request is received, permissions of the ACLs can also be checked to determine if the resource request should be routed to a registered process. Preemptive wildcards can be included in aggregated URIs to identify aggregated URI namespaces. Aggregated URIs can be included in registration requests to override the registration of unauthorized processes.

16 Claims, 10 Drawing Sheets

SECURING UNIFORM RESOURCE IDENTIFIER NAMESPACES

BACKGROUND OF THE INVENTION

1. The Field of the Invention

The present invention relates to computer network security. More specifically, the present invention relates to systems, methods, and computer program products that substantially decrease the likelihood of an unauthorized process receiving a resource request directed to a Uniform Resource Identifier namespace.

2. Background and Relevant Art

Computer systems and related technology affect many aspects of society. Indeed, the computer system's ability to process information has transformed the way we live and work. Computer systems now commonly perform a host of tasks (e.g. information management, scheduling, and word processing) that prior to the advent of the computer system were typically performed manually. More recently, computer systems have been coupled to one another to form computer networks over which computer systems may transfer data electronically.

For the most part, resources are accessed over computer networks using a request/response model. That is, a client computer system (hereinafter referred to as a "client") sends a request (e.g., to access data, to start a remote application, etc.) across a computer network to a server computer system (hereinafter referred to as a "server"). If the server successfully receives the request and there are no technical impediments to processing the request (e.g., the server does not have access to requested data, network communications are not possible, etc.), the server may respond according to the client's request.

Often, a single server will include the functionality to process a number of different types of resource requests. For example, a single server may process resource requests to access data stored in a variety of different formats (e.g., word processing documents, electronic mail messages, Web pages, etc.) and may process resource requests to execute different remote applications (e.g., word processor applications, database management applications, etc.). Each resource request may need to be processed differently due to the configuration of a particular data type or a particular remote application. Thus, to have a server respond in an appropriate manner, received resource requests must include some indication of the functionality that is desired. As such, clients frequently include such an indication within a request.

One very popular request/response model is that used on the World Wide Web ("WWW"), where a client indicates this desired functionality to a server by sending a Uniform Resource Locator ("URL"). A URL generally takes the form of a character string that conforms to established formats for accessing content on the WWW. One established format dictates that a URL can be of the form http://<hostpart>:<port>/<RelativeURI> (e.g., http:/www.uspto.gov:80/main/patents.htm), where <hostpart> is a proper host name (e.g., a fully qualified domain name), <port> is a numeric string representing a Transmission Control Protocol ("TCP") port (e.g., 80 for http), and <RelativeURI> is an arbitrary path that indicates a location within the machine represented by the <hostpart>. In operation, a user of a client typically enters a URL into a Web browser and the machine represented by the <hostpart> of the URL responds appropriately.

At the server, different applications can be configured to respond to resource requests having different URLs. For example, the server may configure a Web server application to respond to Web page requests and configure an electronic mail application to respond to electronic mail message requests. In order for an application to respond to a resource request for a particular URL, the request must first be routed to the application. A routing entity at the server can maintain a number of routing entries in a routing table that correlate URLs to applications. Each entry in the routing table can include a routing URL and an application identifier identifying the application that is registered to receive requests for the URL. When a resource request including a particular URL is received, the routing entity identifies the routing entry with a routing URL that most closely matches the particular URL. The routing entity then routes the resource request to the application identified by the application identifier of the routing entry.

Typically, to add an entry to the routing table, an application desirous of receiving requests for a particular URL indicates this desire to the routing entity by requesting to register with the routing entity. If the routing entity determines that no other application is currently registered to receive requests for the particular URL (i.e., no other application has an entry in the routing table), the attempt at registration will be successful. After the successful registration attempt, an entry correlating the particular URL and the registered application is included in the routing table. From that point on, the entry will cause the routing entity to route all requests for the particular URL to the registered application. Further, subsequent registration requests for the particular URL will be denied since the routing entity will determine (by checking the routing table) that an application (the registered application) is currently registered to receive requests for the particular URL.

One problem in current registration schemes is that virtually any application on a server can register to receive requests for virtually any URL managed by the server. The primary requirement that must be satisfied to approve a registration for a URL is that no other application currently be registered to receive requests for the URL. Thus, an unauthorized application (e.g., a virus, a Trojan Horse, an application designed to intercept personal information, etc.) could successfully register for a particular URL simply by requesting to register for the particular URL before any other applications. Further, a successful registration by a unauthorized application essentially "locks out" any legitimate applications (e.g. those an administrator desires to receive requests for the particular URL) that subsequently request to register for the particular URL. When subsequent requests to register for the particular URL are received, the routing entity will determine (e.g., by checking the routing table) that another application (the unauthorized application) has already registered for the particular URL and thus will deny any subsequent requests.

Further, when a resource request for a particular URL is received, the routing entity simply routes the resource request to an identified application from the routing table. No validation is performed to insure that the identified application is indeed a legitimate application. Thus, once a routing table contains an entry correlating the particular URL and the unauthorized application, the unauthorized application can continue to receive resource requests for the particular URL and may never be detected by the routing entity. This can be problematic for users at clients, as these users may have limited technical expertise and little, if any, resources available to determine what application is on the receiving end of a resource request for the particular URL. Thus, a user at a client may unsuspectingly send a resource request with sensitive personal information such as, for example, a credit card or social security number, that is summarily routed to the unauthorized process.

It may take an increased level of technical expertise, such as, for example, that of a system administrator, to identify that a unauthorized process is receiving requests for the particular URL. However, even if an administrator identifies the unauthorized application, the administrator may have no way to dynamically change the configuration of the routing entity and/or the routing table to prevent the unauthorized application from receiving requests for the particular URL. The administrator may be required to completely disable the routing entity or cut off power to the server, thus also disabling other legitimate applications, to prevent the unauthorized application from receiving requests for the particular URI.

Therefore, what are desired are systems, methods, and computer program products, for securing Uniform Resource Identifier namespaces.

BRIEF SUMMARY OF THE INVENTION

Methods, systems, and computer program products are described for securing Uniform Resource Identifier ("URI") namespaces.

One or more permissions are associated with a particular URI namespace. The particular URI namespace may be one of a number of URI namespaces that are managed by a namespace management module. The namespace management module can maintain a persistent store of reservation entries, wherein each reservation entry (including an entry for the particular URI namespace) has a reservation URI and an reservation Access Control List ("ACL"). The reservation URI of a reservation entry is used to identify a URI namespace and the reservation ACL associates one or more permissions with the URI namespace identified by the reservation URI.

A registration request to register for the particular URI namespace is received. A registration request can include a registration URI, an entity identifier, and a process identifier. The registration URI identifies a URI namespace that is attempting to be registered. The process identifier identifies a receiving process that is interested in receiving resource requests directed to the URI namespace identified by the registration URI. The entity identifier identifiers a registering entity, such as, for example, a user, a process (which may or may not be the receiving process), or a computer system, that is attempting to register the URI name space (or portion thereof) identified by the registration URI.

A registration request can be generated automatically, such as, for example, by including appropriate commands in a configuration file that is processed by a computer system when the computer system is "booted." Likewise, a registration request can be generated manually when a user manipulates an input device, such as, for example, a keyboard, to send commands to a computer system.

The namespace management module can process a registration URI (e.g., by comparing the registration URI to reservation URIs) to identify a reservation entry having reservation ACL with appropriate permissions. The registration request is approved if the permissions so permit. The namespace management module can check the appropriate permissions of the ACL to determine if the entity identifier and/or the process identifier included in the registration request have been granted access to the particular URI namespace. If appropriate access is granted, the registration request can be approved. If appropriate access is not granted, the request is not approved. When a registration request is approved, the namespace management module can add a registration routing entry to a routing database. This registration routing entry can indicate that resource requests for the particular URI namespace are to be routed to the process identified by the process identifier included in the registration request.

Checking permissions from a persistent store of reservation entries before approving a registration request significantly decreases the chances of a unauthorized process successfully registering for a URI namespace.

In some embodiments, the permissions of a reservation entry are checked to determine whether or not routing a resource request to a process is approved. To facilitate such checking, the namespace management module can maintain a routing database. The routing database can contain a registration routing entry for each registered URI namespace (which as previously described can be added to the routing database when a registration is approved). Each registration routing entry includes a registration URI identifying a URI namespace and a process identifier identifying a process that receives resource request for the URI namespace (hereinafter referred to as the "identified process").

The routing database can also contain a reservation routing entry corresponding to each reservation entry in a reservation store. The namespace management module may access each reservation entry in the reservation store and add a corresponding reservation routing entry to the routing database. Each reservation routing entry in the routing database includes a reservation routing URI, which is the reservation URI of the corresponding reservation entry, and a reservation routing ACL, which is the reservation ACL of the corresponding reservation entry. Thus, the routing database can include one or more registration routing entries as well as one or more reservation entries.

A resource request for a URI namespace is received. Such a resource request can include a resource URI that identifies the URI namespace. For example, the namespace management module may receive a URI that was entered into a Web browser by the user of a personal computer. After receiving the resource request, the namespace management module identifies the registration routing entry that best matches the resource request and the reservation routing entry that best matches the resource request.

Identifying the best matching registration routing entry and best matching reservation routing entry can include executing a "Best Match Lookup" algorithm that compares each registration routing URI and reservation routing URI in the routing database to the resource URI. In some cases, a best matching entry can be an entry having a URI that is a longer textual match to the resource URI. In other cases, a best matching entry can be an entry having a preemptive wildcard in a portion of a URI.

It is determined that the best matching reservation entry is a better match than the best matching registration entry. This may occur when a reservation routing URI is a longer textual match to the resource URI than a registration routing URI. For example, the reservation routing URI "http://www.test-.com:80/vroot/subdir1" can be viewed as a longer textual match to the resource URI "http://www.test.com:80/vroot/subdir1/document21.htm" than the registration routing URI "http://www.test.com:80/vroot".

It is indicated that the resource request can be routed to the best matching registration routing entry if one or more permissions of the best matching reservation routing entry so indicate. When the best matching reservation routing entry is a better match, the permissions of the included reservation routing ACL can be checked. Based on the permissions, it is determined if the identified process (in the best matching registration routing entry) is authorized to register the URI namespace identified by the reservation routing URI (in the best matching reservation entry). When an identified process is authorized, the resource request can be routed to the identified process. When an identified process is not authorized, the resource request is not routed to the identified process.

Checking permissions from a reservation entry before routing a resource request to a registered identified process can significantly decrease the chance of an unauthorized process receiving a resource request. Even if an unauthorized process were to somehow successfully register, checking permissions at the time a resource request is received can detect that the unauthorized process is not to receive resource requests for a URI namespace.

In some embodiments, a preemptive wildcard is used to identify an aggregated URI namespace. It is determined that at least one portion of a first URI differs from a corresponding at least one portion of a second URI. This can include identifying differences in the text of the URIs. A preemptive wildcard is assigned to represent the differing portions. A text character, such as, for example, the "+" character can be used to represent the preemptive wildcard. The preemptive wildcard is then included in an aggregated URI used to identify an aggregated URI namespace.

Preemptive wildcards can be included in registration requests to override existing registration entries in a routing database. The ability to override other registration entries can be particularly beneficial for preventing a registered unauthorized process from receiving resource requests. An administrator that identifies a unauthorized process can register for an aggregated URI namespace to override a prior registration for a URI namespace associated with the unauthorized process. Registering a URI namespace with a preemptive wildcard has a reduced impact on other registered URI namespaces as compared to completely disabling the namespace management module or removing power from a computer system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
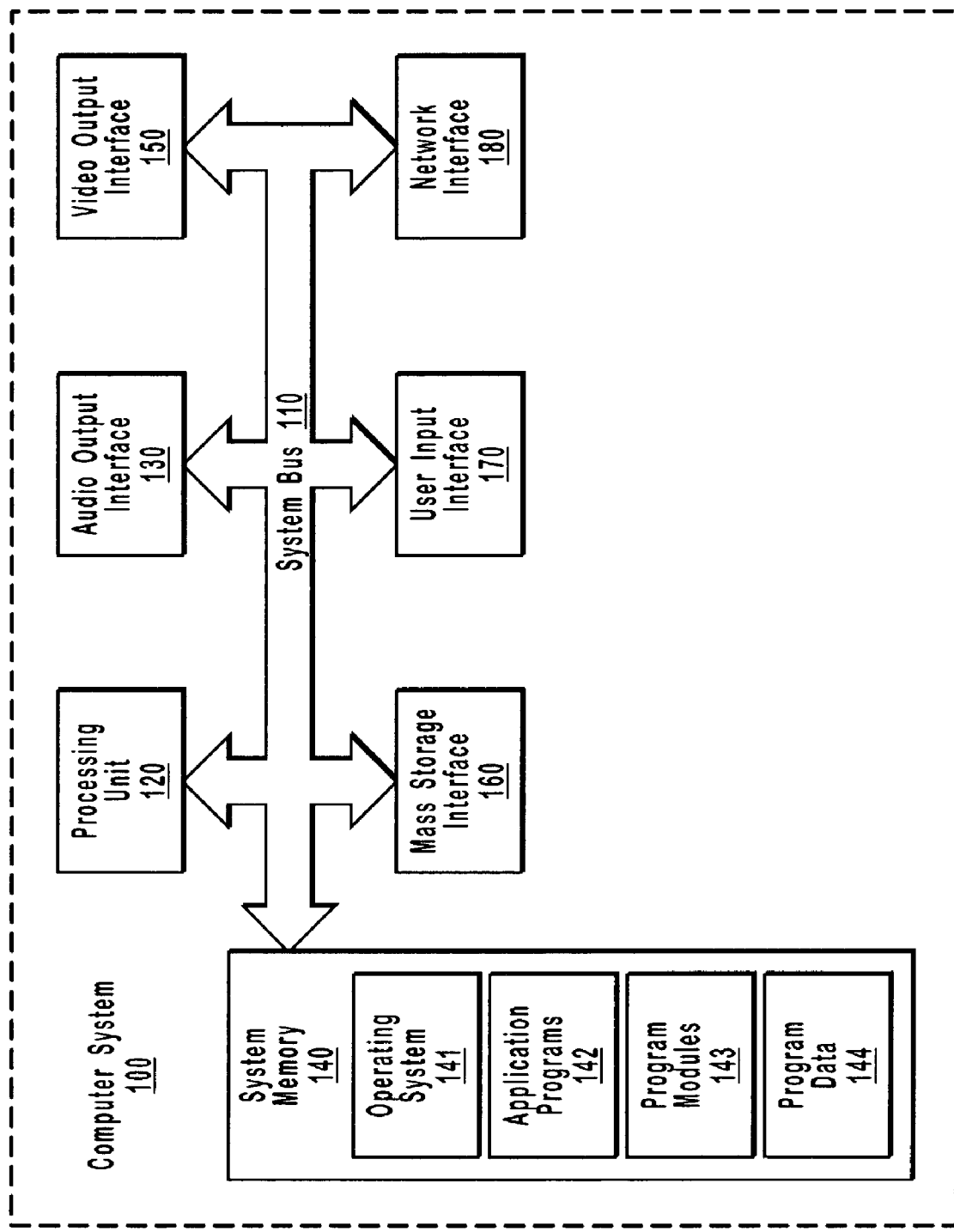
FIG. 1 illustrates an example of a computer system that provides a suitable operating environment for the present invention.

The present invention extends to systems, methods, and computer program products for securing Uniform Resource Identifier ("URI") namespaces. A namespace management module at a computer system maintains a persistent reservation store. Each reservation entry in the reservation store can include a reservation URI identifying a URI namespace and can include a reservation access control list ("ACL") having one or more permissions associated with the URI namespace. These one or more permissions can indicate users and/or processes that are permitted to register to receive resource requests for the URI namespace identified by the reservation URI.

The namespace management module can receive registration requests that include a registration URI, a entity identifier, and a process identifier. The registration URI identifies a URI namespace, the entity identifier identifiers the entity requesting the registration (e.g., a user or another process), the process identifier identifies a process that is desirous of receiving resource requests for the URI namespace identified by the registration URI. In response to receiving a registration request, the namespace management module may identify a corresponding reservation entry from the reservation store. A corresponding reservation entry can be the reservation entry having a reservation URI that more closely matches the registration URI included in the registration request. The namespace management module can then check the permissions in the reservation ACL of the corresponding reservation entry to determine if the registration is to be approved or denied.

The namespace management module can also maintain a routing database that includes one or more registration routing entries and one or more reservation routing entries. When a registration request is approved, the namespace management module may add a registration routing entry to the routing database. Each registration routing entry in the routing database can include a registration routing URI, which may be a registration URI of an approved registration request, and can include a process identifier identifying the process that is to receive requests for the URI namespace represented by the registration routing URI.

Reservation routing entries can be added to the routing database during startup of the namespace management module. The namespace management module may read each reservation entry in the reservation store and include a corresponding reservation routing entry in the routing database. Thus, each reservation routing entry can include a reservation routing URI, which may be a reservation URI from the reservation store, and a reservation routing ACL, which may be a reservation ACL from the reservation store.

The namespace management module may receive a resource request that includes a resource URI identifying a URI namespace. A best match lookup algorithm can identify the registration routing entry that is the best match to the resource request. Likewise, the best match lookup algorithm can identify the reservation routing entry that is the best match to the resource request. In some embodiments, a best matching entry will be an entry that has a URI that is a longer textual match to the resource URI.

It is determined that the best matching reservation routing entry is a better match than the best matching registration routing entry. This determination can result when a reservation routing URI is a longer match to the resource URI than a registration routing URI. This determination can also result when the reservation routing URI and the registration routing URI are an equal match to the resource URI. Due to the hierarchical nature of URI namespaces, such a determination may indicate that routing the resource request according to the best matching registration routing entry is not authorized. However, such a determination may also indicate that the entity that registered the best matching registration routing entry was authorized to register for the URI namespace represented by the best matching reservation entry but for some reason did not register the best matching reservation routing entry.

The permissions in the reservation routing ACL of the best matching reservation routing entry are checked to identify whether or not the entity that registered the best matching registration routing entry is also permitted to register the best matching reservation routing entry. If the permissions indicate the entity is permitted to register the best matching reservation routing entry, the resource request can be routed to the best matching registration routing entry. However, if the permissions indicate the entity was not permitted to register the best matching reservation routing entry, the resource request is rejected.

In some cases, a preemptive wildcard is included in a URI to identify an aggregated namespace. A preemptive wildcard can be included in a reservation entry to override one or more previous reservation entries in the persistent store. Similarly, a preemptive wildcard can be included in registration routing entry to override one or more previous registration routing entries in the routing database.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, multi-processor systems, minicomputers, mainframe computers, network PCs, routers, gateways, firewalls, proxies, hand-held devices, microprocessor-based or programmable consumer electronics, mobile telephones, PDAs, pagers, and the like. The invention may also be practiced in distributed system environments where local and remote computer systems, which are linked (either by hardwired links, wireless links, or by a combination of hardwired or wireless links) through a communication network, both perform tasks. In a distributed system environment, program modules may be located in both local and remote memory storage devices.

In this description and in the following claims, a "logical communication link" is defined as any communication link that enables the transport of electronic data between two message processors. The actual physical representation of a communication path between two entities is not important and may change over time. A logical communication link may include portions of a system bus, a local area network, a wide area network, the Internet, combinations thereof, or portions of any other paths that facilitates the transport of electronic data. Logical communication links can include hardwired links, wireless links, or a combination of hardwired links and wireless links. In the description of the figures that follow, a logical communication link is represented by an arrow or a solid line. It should be understood that a logical communication link can include any number of message processors, such as, for example, proxies, routers, firewalls, gateways, or computer systems. However to simplify the description, these message processors may not be shown. Logical communication links may also include portions of a Virtual Private Network ("VPN").

In this description and in the following claims, a "uniform resource identifier" ("URI") is defined as a string of characters for identifying an abstract or physical resource. The URI syntax consists of a number of portions separated by reserved characters, with the first portion defining the semantics for the remainder of the URI string. Generally, an absolute URI can be represented in the format <scheme>:<scheme-specific-part>. An absolute URI contains a portion of characters indicating the name of the scheme being used (represented by <scheme>) followed by a colon (":") and then a portion of characters (the <scheme-specific-part>) whose interpretation depends on the scheme. The URI syntax does not require that the <scheme-specific-part> have any general structure or set of semantics that is common between all URI. However, some subsets of URI do share a common syntax for identifying resources.

In this description and in the following claims, a "uniform resource locator" ("URL") is defined as a subset of URI that identify resources via a representation of their primary access mechanism (e.g., their network location). Similar to an absolute URI, an absolute URL can be represented generally in the format <scheme>:<scheme-specific part>. The syntax for the <scheme-specific-part> of a URL may vary depending on the particular scheme selected.

However, some URL schemes associated with the use of an Internet Protocol ("IP") based protocol (hereinafter referred to as "IP based schemes"), such as, for example, http: and https:, may use the common syntax://<hostpart>:<port>/<RelativeURL> for scheme specific data. Thus, an absolute URL for an IP based scheme can take the form <scheme>://<hostpart>:<port>/<RelativeURL>. The <scheme> component of an absolute URL defines the scheme for the URL (e.g., http:, https:, gopher:, ftp:, etc.). The <hostpart> component can be a proper host name, such as, for example, a fully qualified domain name. The <hostpart> can be used to represent hostnames of different addressing formats, such as, for example, IP version 4 and IP version 6. The <port> component can be a numeric string representing the Transmission Control Protocol ("TCP") port number associated with the absolute URL. The <RelativeURL> component is an arbitrary path that indicates a subtree within a computer systems namespace, such as, for example, a computer system represented by the <hostpart> component.

In this description and in the following claims, a "URI Prefix" is defined as a character string resulting from the concatenation of the <hostpart> component, <port> component, <RelativeURI> component of a URI, and appropriate reserved characters. For example, the absolute URI http://www.site1.com:80/vroot/subdir may be viewed as having a URI prefix of http://www.site1.com:80/vroot/.

An absolute URL or URI refers to a resource independent of the context in which the URL or URI is used. In contrast, a relative URL or URI refers to a resource by describing the difference within a hierarchical namespace between the current context and an absolute URL or URI of the resource.

It may be the case that a hierarchical arrangement or "tree" of resources has been constructed to serve a common purpose. For example, some URL schemes (e.g., the ftp:, http:, and file: schemes) support a hierarchical naming system, where the hierarchy of the name is denoted by a "/" delimiter separating the components in the scheme. When using a hierarchical naming system, resources contained in the hierarchical naming system may frequently reference other resources also contained in the hierarchical naming system, as opposed to other resources outside of the hierarchically naming system. Relative addressing of URL, as well as URI, allows resources in a hierarchical naming system to be partially independent of their location and access scheme. Relative URL or URI references are distinguished from absolute URL or URI in that they do not begin with a scheme name. For example, it is possible for a single set of hypertext documents to be simultaneously accessible and traversable via both the http: and ftp: schemes, if the documents refer to each other using relative URI. Furthermore, such document trees can be moved, as a whole, without changing any of the relative references.

For clarity, some embodiments of the present invention may be described in the context of hierarchical arrangements of IP based URL schemes, such as, for example, http:, https:, ftp:, and gopher:. However, it should be understood that embodiments of present invention are not limited to these hierarchical URL schemes. It would be apparent to one skilled in the art, after having reviewed this description, that embodiments of the present can be practiced using a wide variety of URI schemes, in addition to hierarchical URL schemes expressly described.

In this description and in the following claims, a URI may be referred to by a particular function, such as, for example, "reservation", "registration routing", "resource" and so forth, that can be facilitated by processing the URI. When such references are made, a descriptive term representing the function a particular URI can facilitate may be used to label the particular URI, such as, for example, "reservation" URI, "registration routing" URI, "resource" URI, and so forth, when describing the URI. This is for descriptive purposes only so as to help distinguish between multiple URIs that may be processed in a given context. However, this is not meant to imply that a URI is limited to only facilitating the labeled functions used to describe the URI.

In this description and in the following claims, a "URI namespace" is defined as hierarchical arrangement of URIs or a portion of a hierarchical arrangement of URIs. A URI namespace can be identified by a URI.

In this description and in the following claims, an "Access Control List" ("ACL") is defined as a set of data that indicates to an appropriate process, such as, for example, a namespace management module, the permissions or access rights that entities have to a URI namespace. An ACL can include an entity identifier that identifies a user, process, or computer system and a corresponding access mode indicating whether an entity has been granted or denied access to a URI namespace. An ACL can also include an indication of whether an entity may delegate access to a URI namespace to another entity. An ACL may have one or more Access Control Entries where each Access Control Entry indicates permissions or access rights for a different entity.

In this description and in the following claims, an "unauthorized process" is defined as a process that receives (or attempts to receive) resource requests for a URI namespace even though an ACL for the URI namespace indicates that the process does not have permission to receive resource requests for a URI namespace. Unauthorized process is defined to include unauthorized processes, such as, for example, viruses and Trojan Horses.

In this description and in the following claims, a "preemptive wildcard" is defined as a symbol that matches one or more characters. Virtually any symbol can represent a preemptive wildcard. However, in this description the "+" character will be used. For example, the URI http://+:80/root can be viewed as a match to the URI http://site1.com:80/root and the URI http://site2.com/root. A preemptive wildcard is a better match for one or more characters even if textual match exists (or there is a postemptive wildcard). For example, if searching for a match to the URI http://site1.com:80/root the identified URI http://+:80/root can be given priority over the textual matching URI http://site1.com:80/root. Thus, a preemptive wildcard overrides other matches even if a match is a textual match.

In this description and in the following claims, a "postemptive wildcard" is defined as a symbol that matches one or more characters. Virtually any symbol can represent a postemptive wildcard. However, in this description the "*" character will be used. For example, the URI http://*:80/root can be viewed as a match to the URI http://site1.com:80/root and the URI http://site2.com/root. However, unlike a preemptive wildcard, a postemptive wildcard is not a better match for one or more characters when a textual match exists (or there is a preemptive wildcard). For example, if searching for a match to the URI http://site1.com:80/root the identified URI http://*:80/root would not be given priority over the textual matching URI http://site1.com:80/root. Thus, a postemptive wildcard is only a match for one or more characters if neither a preemptive wildcard nor a textual match results.

In this description and in the following claims, "reservation" is defined as an operation that reserves or delegates a portion of a URI namespace for use by a particular entity.

In this description and in the following claims, "registration" is defined as an operation in which an entity indicates a desire to receive requests for a portion URI namespace. A registration can occur, for example, when an application begins operation. When an entity registers for a portion of a URI namespace that is reserved for the entity, the registration may be successful. On the other hand, when an entity registers for a portion of a URI namespace that is not reserved for the entity, the registration fails.

In this description and in the following claims, "routing" is defined as determining what application is to receive a request. This can include determining that an application that registered to receive requests for a portion of a URI namespace receives a request directed to the portion of the URI namespace.

In the Figures, when a sole period is encountered on three consecutive lines (i.e., a vertical ellipsis), this represents that other entries or processes, as the case may be, may precede, follow, or be interspersed between other illustrated entries or processes.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein.

Computer system 100 includes a user input interface 170 that receives information from an input device, such as, for example, a keyboard, microphone, or mouse. An input device can be coupled to user input interface 170 so as to enable the entry of information. An input device may transfer information over such a coupling in response to preprogrammed data or user manipulation of the input device.

Computer system 100 includes a video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which may include a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may include mass storage interface 160, which can read data from and/or write data to a mass storage device, such as, for example, a magnetic disk or optical disk. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computer system 100 may be network connectable to networks, such as, for example, an office-wide or enterprise-wide computer network, an intranet and/or the Internet. Computer system 100 may exchange data with external sources, such as, for example, remote processor systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network.

Likewise, computer system 100 includes serial port interface 190, through which computer system 100 receives data from external sources and/or transmits data to external sources. Serial port interface 190 is coupled to modem 191, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network.

Alternatively, the exchange of data with external sources may be facilitated by other interfaces, such as, for example, a parallel port, a game port or a universal serial bus ("USB").

It should be understood that the illustrated network connections are merely examples. It would be apparent to one skilled in the art, after having reviewed this description, that a wide variety of network connection techniques may be used to facilitate the exchange of data between computer system 100 and external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, namespace management modules, registration modules, routing modules, and identified processes as well as associated data, including registration requests, resource requests, reservation entries, registration routing entries, and reservation routing entries, may be stored and accessed from any of the computer-readable media associated with computer system 100. For example, portions of such modules and portions of associated program data may be included in operating system 141, application programs 142, program modules 143 and/or program data 144, for storage in system memory 140. If a mass storage device is coupled to computer system 100, such modules and associated program data may also be stored in the mass storage device.

In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
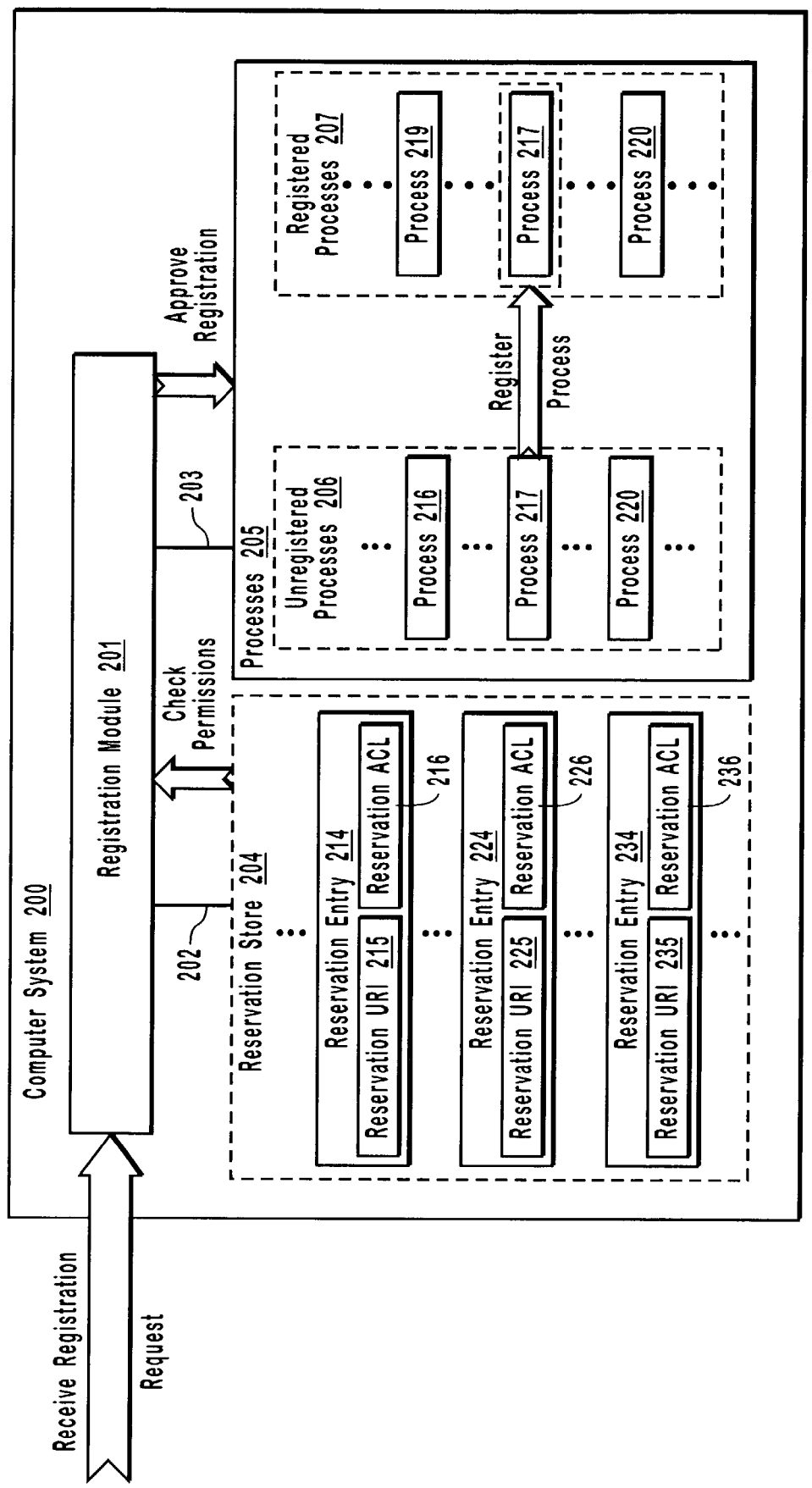
FIG. 2 illustrates an example of some of the functional components that facilitate validating a registration request based on permissions.
Figure 5:
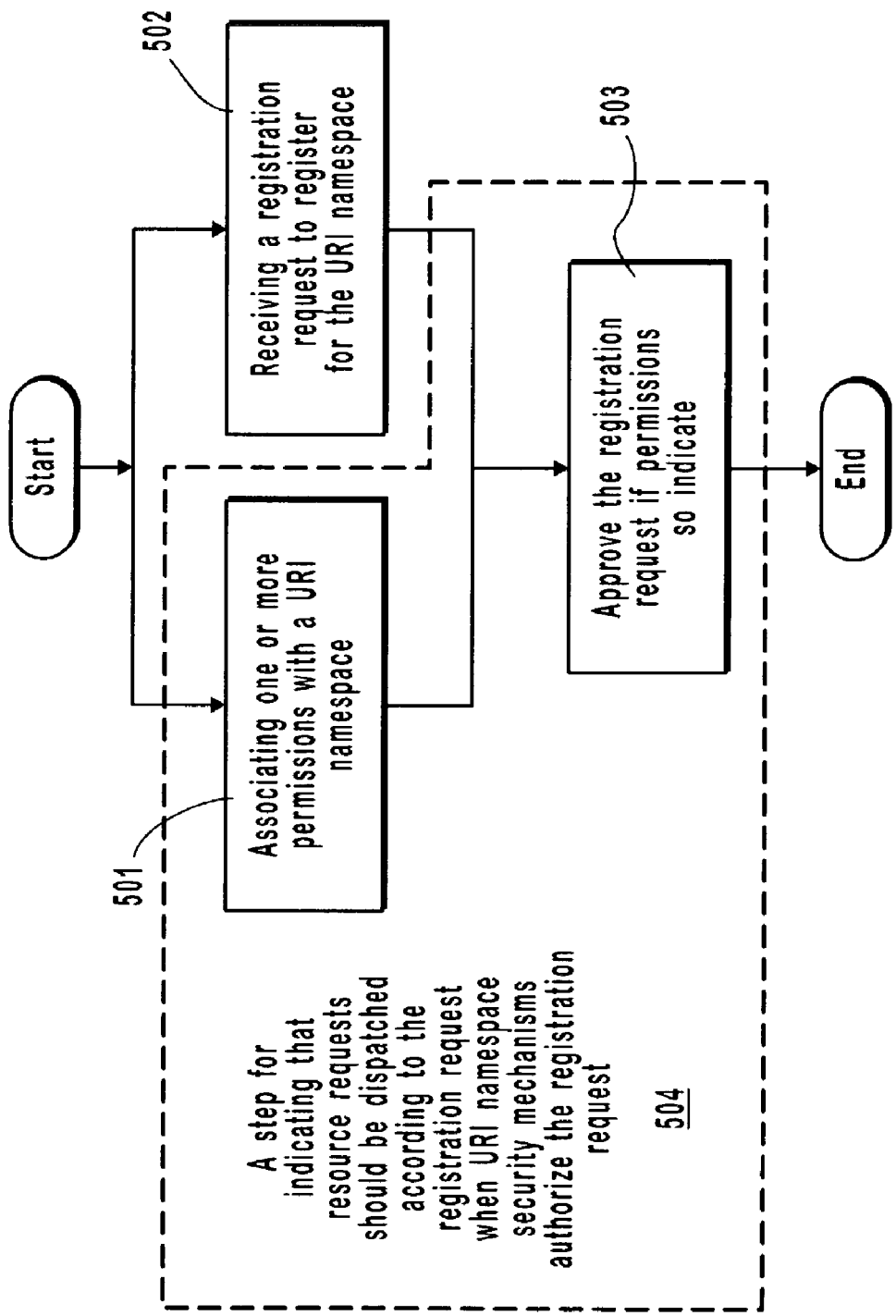
FIG. 5 is a flow diagram illustrating an example of a method for validating a registration request based on permissions

FIG. 2 illustrates some of the functional components that facilitate validating a registration request based on permissions. FIG. 5 is a flow diagram illustrating an example of a method for validating a registration request based on permissions. The method of FIG. 5 will be discussed with reference to the functional components of FIG. 2.

The method in FIG. 5 may begin with a functional, result-oriented step for indicating that resource requests should be dispatched according to a registration request if URI namespace security mechanisms authorize the registration request (step 504). Step 504 may be performed so as reduce the chances of routing data requests to an unauthorized process. Step 504 may include any corresponding acts for accomplishing the result of dispatching resource requests according to a registration request when namespace security mechanisms authorize the registration request. However, in the illustrated example of FIG. 5, the step 504 includes a corresponding act of associating one or more permissions with a URI namespace (act 501).

In FIG. 2, computer system 200 contains reservation store 204, which can be stored in a mass storage device and thus may persistent even when the components of computer system 200 do not receive power (e.g., when computer system 200 is turned "off" or a power outage occurs). Reservation store 204 includes a number of reservation entries, such as, for example, reservation entries 214, 224, and 234. Each reservation entry included in reservation store 204 may have a reservation URI and a corresponding reservation ACL. For example, reservation entry 214 has reservation URI 215 and reservation ACL 216. A reservation URI (e.g. reservation URI 215) identifies a URI namespace and a corresponding reservation ACL (e.g. reservation ACL 216) includes permissions associated with the URI namespace identified by the reservation URI. A reservation ACL may include permissions indicating the entities (e.g. users, processes, or computer systems) that are permitted to register the URI namespace identified by the reservation URI.

Figure 8:
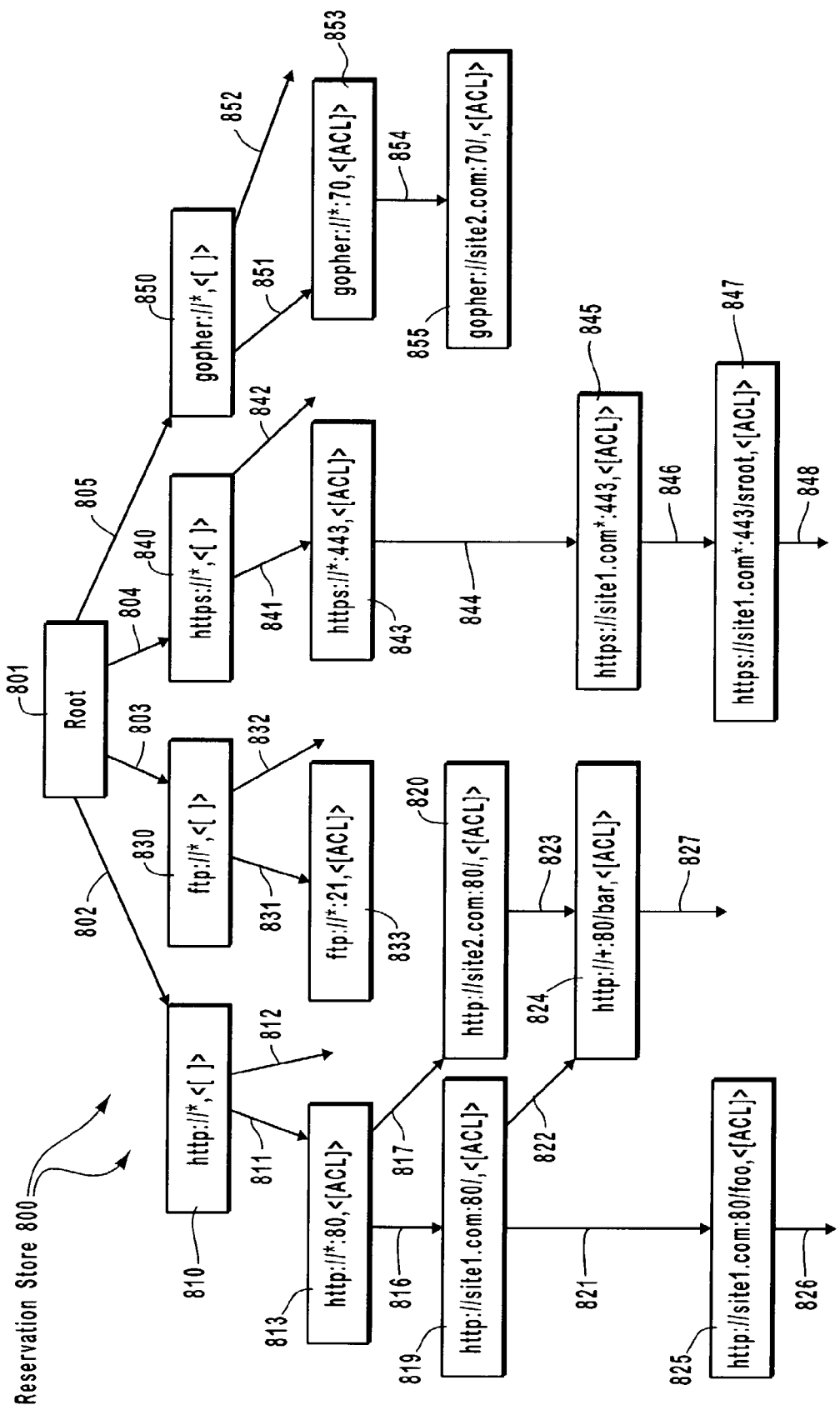
FIG. 8 illustrates an example of a hierarchical reservation store.

A reservation store, such as, for example, reservation store 204, can be viewed as having a hierarchical arrangement of reservation entries for a number of URI schemes. FIG. 8 illustrates a reservation store 800 including reservation entries for the http: scheme (identified by reservation entry 810), the ftp: scheme (identified by reservation entry 830), the https: scheme (identified by reservation entry 840), and the gopher: scheme (identified by reservation entry 850). Reservation entries for a URI namespace identified by only the scheme, such as, for example reservation entries 810, 830, 840, and 850, can enable a process to receive resource requests for an entire hierarchical tree. Thus, a namespace management module may implicitly reserve these reservations for use by a system administrator.

However, reservation entries identifying URI namespaces containing only portions of a hierarchical tree can be delegated to other users. When an entity (e.g. a user, process, or computer system) has the appropriate permissions for a URI namespace, the entity can add entries to the reservation store delegating that other entities have permission to access a portion of the URI namespace. For example, a system administration may delegate to the managing user of a Web server the ability to access the URI namespace http://*:80. As such, the system administrator may add reservation entry 813 to a reservation store. The ACL of reservation entry 813 can indicate that the managing user of the Web server has permissions to access the URI namespace http://*:80.

When delegating a URI namespace, the ACL of a reservation entry may also indicate whether an entity receiving access to a URI namespace may further delegate the URI namespace. In the immediately preceding example, the system administrator may give the managing user of the Web server permission to further delegate the URI namespace http://*:80. Thus, the managing user can delegate portions of the URI namespace http://*:80to other entities. For example, the managing user may delegate the URI namespace http://site1.com:80/to a first entity (reservation entry 819) and the URI namespace http://site2.com:80/to a second entity (reservation entry 820). The managing user may indicate in the ACLs of reservation entries 819 and 820 whether the first and second entities can further delegate the URI namespaces.

Arrows in reservation store 800 that do not expressly point to a reservation entry, such as, for example, arrows 812, 827, and 852, indicate that other reservation entries in addition to those expressly illustrated may exist.

The method in FIG. 5 also includes an act of receiving a registration request to register for the URI namespace (act 502). As illustrated in FIG. 2 by the arrow labeled "Receive Registration Request," registration module 201 can receive requests to register a URI namespace. A registration request can include a registration URI, a process identifier, and an entity identifier. The registration URI identifies a URI namespace that is attempting to be registered. The process identifier identifies a receiving process that is interested in receiving resource requests directed to the URI namespace identified by the registration URI. The entity identifier identifiers a registering entity, such as, for example, a user, a process, or a computer system, that is attempting to register the URI namespace identified by the registration URI.

In the illustrated example of FIG. 5, the step 504 also includes a corresponding act of approving the registration if permissions so indicate (act 503). As illustrated in FIG. 2 by the arrow labeled "Check Permissions," registration module 201 may check the appropriate permissions of a reservation ACL contained in reservation store 204. Registration module 201 may access reservation entries via logical communication link 202 to identify a reservation entry having a reservation ACL with appropriate permissions.

Identifying a reservation entry having a reservation ACL with appropriate permissions can include processing the received registration request to identify components of the registration URI that are similar to components of a reservation URI. Similar components can be components that are a textual match. For example, the <scheme> components of a reservation URI with a <scheme> component of http: and a registration URI with a <scheme> component of http: can be viewed as a similar. Similarity in URI components can also be indicated when a component of a reservation URI is represented by a preemptive or postemptive wildcard. For example, the <hostpart> component of a reservation URI with a preemptive wildcard for the <hostpart> component can be viewed as similar to the <hostpart> component of any registration URI. It should be understood that these are merely examples of identifying similar components in URIs. It would be apparent to one skilled in the art, after having reviewed this description, that any number of techniques, in addition to textual matching and wildcards, may be used to identifying similar components in URIs.

Figure 10:
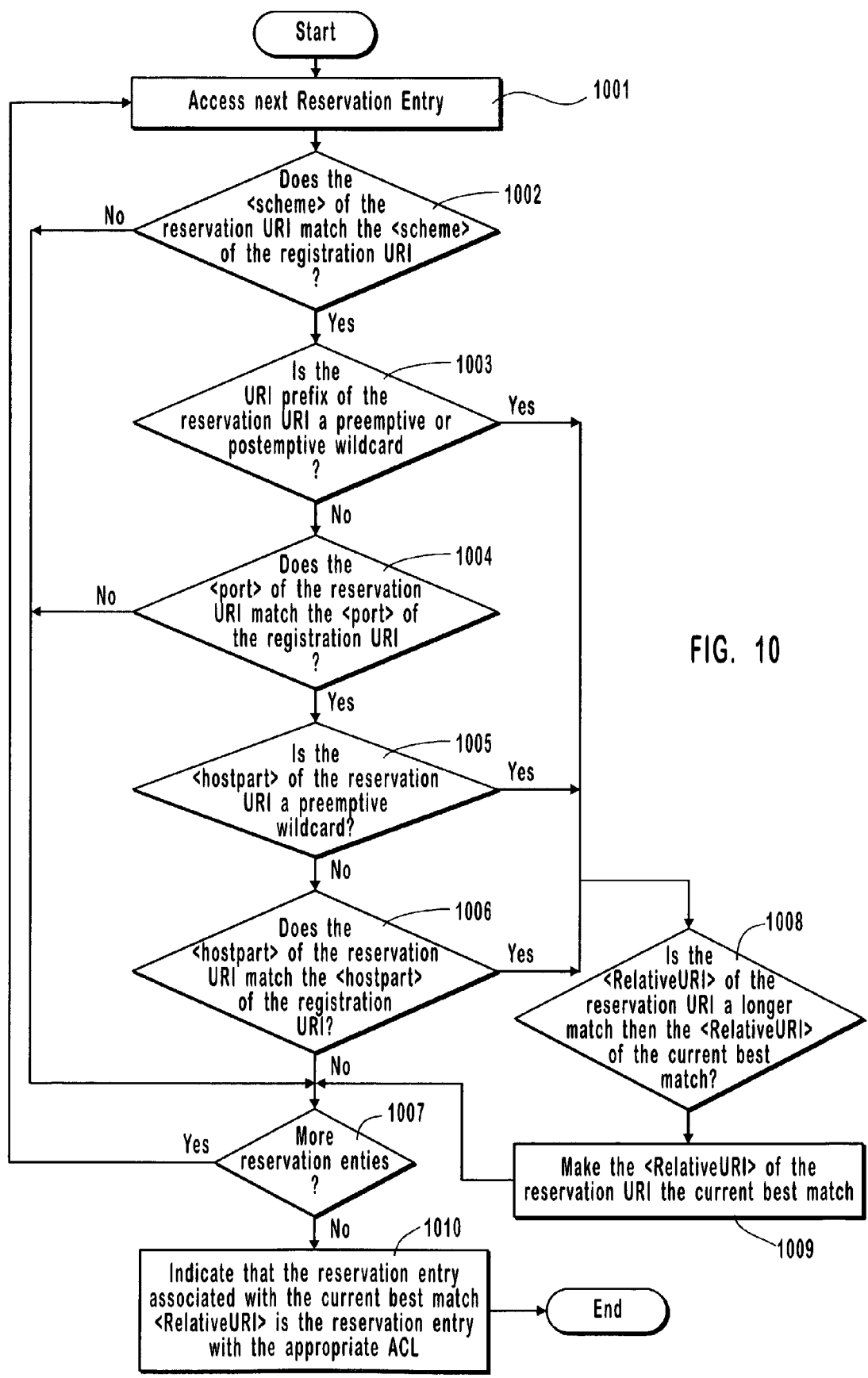
FIG. 10 is a flow diagram illustrating an example of a method for processing a registration request.

FIG. 10 is flow diagram illustrating one example of a method for processing a registration request to identify a reservation entry having a reservation ACL with appropriate permissions. The method in FIG. 10 begins with accessing the next reservation in the reservation store (act 1001). An accessed reservation can be a reservation entry from reservation store 204 having both a reservation URI and a reservation ACL. Accessing the next reservation entry can include accessing a first reservation entry if no reservation entries have yet been accessed. At decision block 1002 it is determined if the <scheme> component of the reservation URI matches the <scheme> component of the registration URI. For example, the <scheme> component of the reservation URI http://site1.com would match the <scheme> component of registration URI http://site1.com.

When the <scheme> components match (YES at decision block 1002), it is determined at decision block 1003 if the URI prefix of the reservation URI is a preemptive or postemptive wildcard.

When the URI prefix is not a preemptive or postemptive wildcard (NO at decision block 1003), it is then determined at decision block 1004 if the <port> component of the reservation URI matches the <port> component of the registration URI. For example, the <port> component of the reservation URI http://www.test.com:80/root would match the <port> component of the registration URI http://www.site4.com:80/root/subdir1. That is, both have <port> component of 80.

When the <port> components match (YES at decision block 1004), it is then determined at decision block 1005 if the <hostpart> of the reservation URI is a preemptive wildcard.

When the <hostpart> component of the reservation URI is not a preemptive wildcard (NO at decision block 1005), it is then determined at decision block 1006 if the <hostpart> component of the reservation URI matches the <hostpart> component of the registration URI.

When the <hostpart> components do not match (No at decision block 1006), when the <port> components do not match (NO at decision block 1004), or when the <scheme> components do not match (NO at decision block 1002) this may indicate that the components of the reservation URI lack similarity to the components of the registration URI. When one of these cases occurs, it is then determined at decision block 1007 if more reservation entries are to be accessed. When there are more reservations to be accessed (YES at decision block 1007), the method accesses the next reservation entry (act 1001).

When <scheme> components match (YES at decision block 1002) and the URI prefix of the reservation URI is a preemptive or postemptive wildcard (YES at decision block 1002), there is similarity between the reservation URI and the registration URI. A preemptive wildcard for the URI prefix could result in the reservation URI ftp://+ and a postemptive wildcard for the URI prefix could result in the reservation URI ftp://*. Either of the these reservation URIs can be viewed as being similar to any registration URI with a scheme component of ftp:

When the <scheme> components match (YES at decision block 1002), the <port> components match (YES at decision block 1004) and the <hostpart> of the reservation URI is a preemptive wildcard (YES at decision block 1005), there is similarity between the reservation URI and the registration URI. For example, the reservation URI http://+:80/vroot/dir can viewed as being similar to the registration URI http://site1.com:80/vroot/dir because the preemptive wildcard would be similar to any <hostpart> component in the registration URI When the <scheme> components match (YES at decision block 1002), the port components match (YES at decision block 1004) and the <hostpart> components match (YES at decision block 1006), there is similarity between the reservation URI and the registration URI. For example, the reservation URI http://site1.com:80/vroot can viewed as being similar to the registration URI http://site1.com:80/vroot/dir due to textual matches in the components.

When there is similarity in URIs (YES at decision block 1003, 1005, or 1006), it is determined at decision block 1008 if the <RelativeURI> of the reservation URI is a longer match that the <RelativeURI> of the current best match. A longer match may be a match that has increased textual similarity. For example, the <RelativeURI> component of the reservation URI http://site1.com/vroot/dir1/would be a longer match to the <RelativeURI> component of the registration URI http://site1.com/vroot/dir1/subdir2 than would be the <RelativeURI> component of the reservation URI http://site1.com/vroot. In a hierarchical namespace a longer match may also indicate a portion of a URI namespace that is further removed from the root of the hierarchical namespace. If there is no current best match, such as, for example, in the first instance of similarity between the registration URI and a reservation URI, the <RelativeURI> of the reservation entry is found to be a better match.

When the <RelativeURI> of the reservation entry is found to be a better match (YES at decision block 1008), the <RelativeURI> of the reservation URI is made the current best match (act 1009). Act 1009 can also include storing the accessed reservation entry. After act 1009, the method can proceed to decision block 1007 where it is determined if more reservation entries are to be accessed.

When there are no more reservations to be accessed (NO at decision block 1007), it is indicated that the reservation entry associated with the current best match <RelativeURI> is the reservation entry having a reservation ACL with the appropriate permissions (act 1010).

The appropriate permissions can then be checked to determine if the registration request is approved. This can include determining if the entity identified by the entity identifier and/or the process identified by the process identifier are authorized to register for the URI namespace identified by the registration URI. If the permissions indicate the entity and/or process are authorized, the registration request can be approved. As illustrated in FIG. 2 by the arrow labeled "Approve Registration," registration module 201 may indicate to processes 205 via logical communication link 203 that the registration was approved.

After the registration approval, a process in unregistered processes 206 may be transferred to registered processes 207. For example, as indicated in FIG. 2 by the arrow "Register Process", process 217 is transferred from unregistered processes 206 to registered processes 207. The dashed line surrounding process 217 in registered processes 207 indicates that process 217 was transferred to registered processes 207 as a result of an approved registration request.

Transferring a process to registered processes 207 can include activating a previously inactive process. For example, an unregistered process stored at a mass storage device may be activated and transferred to system memory after an approved registration request. However, transferring the process to system memory upon an approved registration, does not remove the process from the mass storage device. Thus, an inactive version of the process may remain stored at a mass storage device after the process is transferred to system memory. In FIG. 2, this is illustrated by process 217 remaining in unregistered processes 206 after process 217 has been transferred to registered processes 207.

When a registration request is approved, a registration routing entry associating a registered process with a URI namespace may be included in a routing database.

When permissions indicate that a registration request is not approved, no processes are registered or transferred to system memory. Thus, the process identified by the process identifier does not gain the functionality to receive resource requests for the URI namespace identified by the registration URI. Further, a message indicating that the registration request was not approved can be returned to the entity identified by the entity identifier.

Figure 3:
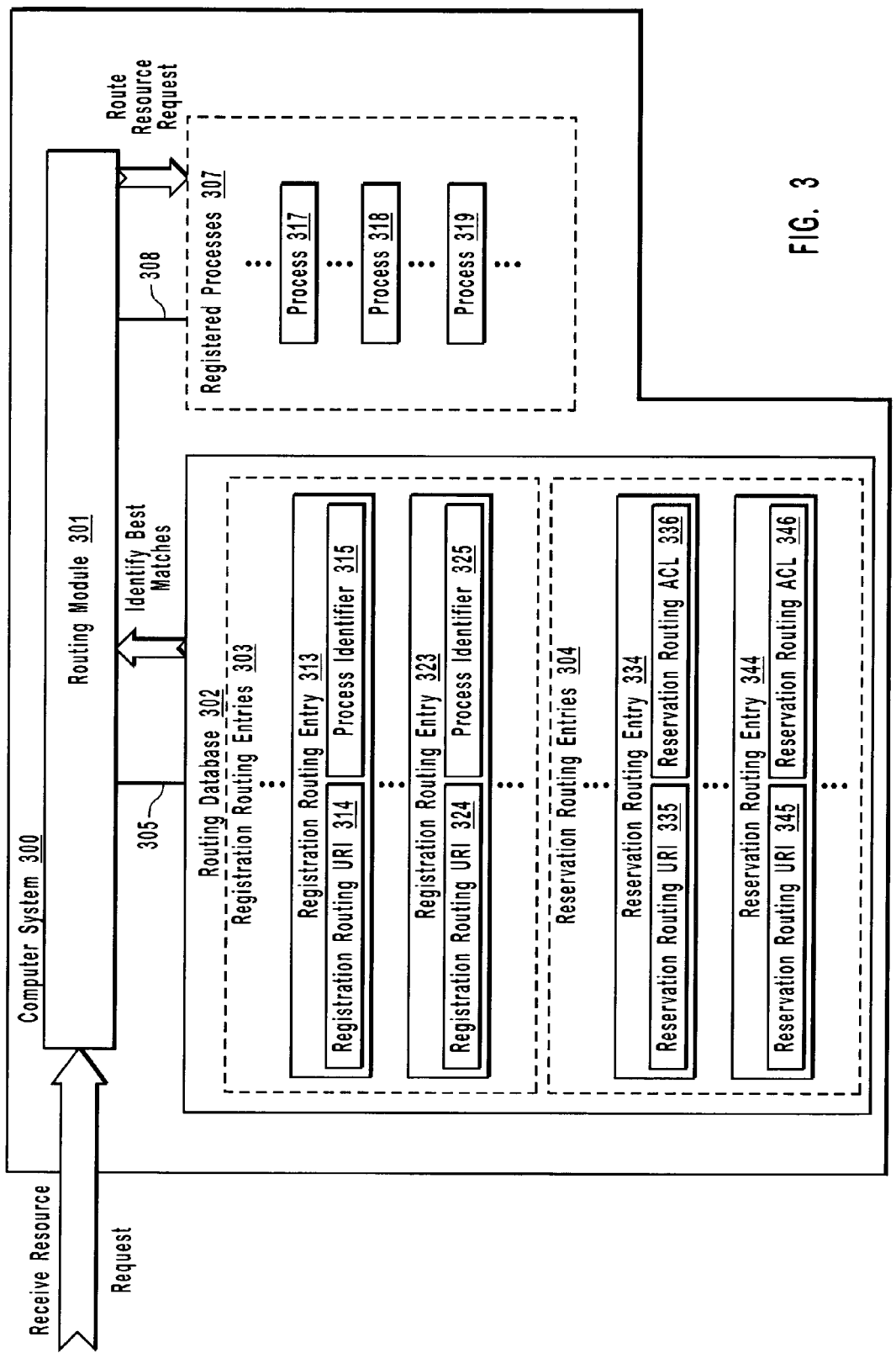
FIG. 3 illustrates an example of some of the functional components that facilitate routing a resource request to a process associated with a URI namespace if permissions so indicate.
Figure 6:
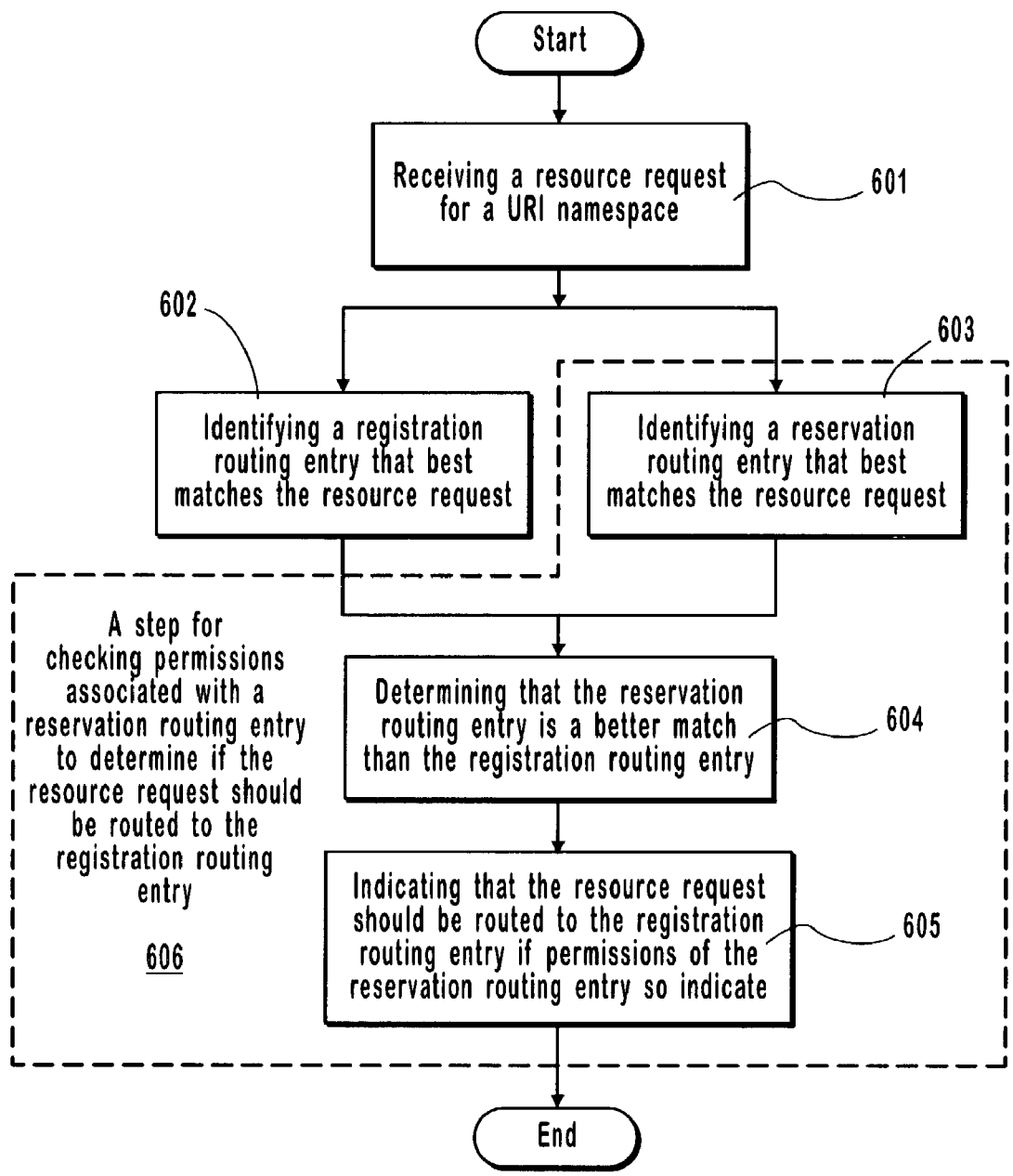
FIG. 6 is a flow diagram illustrating an example of a method for routing a resource request to a process associated with a URI namespace if permissions so indicate.

FIG. 3 illustrates some of the functional components that facilitate routing a resource request to a process associated with a URI namespace if permissions so permit. FIG. 6 is a flow diagram illustrating an example of a method for routing a resource request to a process associated with a URI namespace if permissions so permit. The method of FIG. 6 will be discussed with reference to the functional components of FIG. 3.

The method in FIG. 6 begins with an act of receiving a resource request for a URI namespace (act 601). As illustrated in FIG. 3 by the arrow labeled "Receive Resource Request," routing module 301 can receive resource requests for a URI namespace. A resource request can include a resource URI that identifies a resource within a URI namespace.

The method in FIG. 6 also includes an act of identifying a registration routing entry that best matches the resource request (act 602). As illustrated in FIG. 3 by the arrow labeled "Identify Best Matches," routing module 301 may identifying a best matching registration routing entry from routing database 302. Routing module 301 may access registration routing entries 303 via logical communication link 305 to identifying a best matching registration routing entry.

Routing database 302 contains a number registration routing entries, such as, for example, registration routing entries 313 and 323, collectively labeled as registration routing entries 303. Each registration routing entry included in registration routing entries 303 has a registration routing URI and a corresponding process identifier. For example, registration routing entry 313 has registration routing URI 314 and corresponding process identifier 315. A registration routing URI identifies a URI namespace and a process identifier identifies a registered process that receives resource requests for the URI namespace identified by the registration routing URI.

As previously described above, an registration routing entry may be added to a routing database each time registration request is approved. Thus, the process identifier for each registration routing entry in registration routing entries 303 may identify a process in registered processes 307. For example, process identifier 315 may identify process 319.

Identifying a registration routing entry that is the best match to a resource request can include identifying components of a registration routing URI that are similar to components of a resource URI. As previously described similar components can be components that are a textual match or components that are represented by a preemptive or postemptive wildcard. In some embodiments, a "best match algorithm" is utilized to identify a registration routing entry that is the best match to a resource request.

Figure 9:
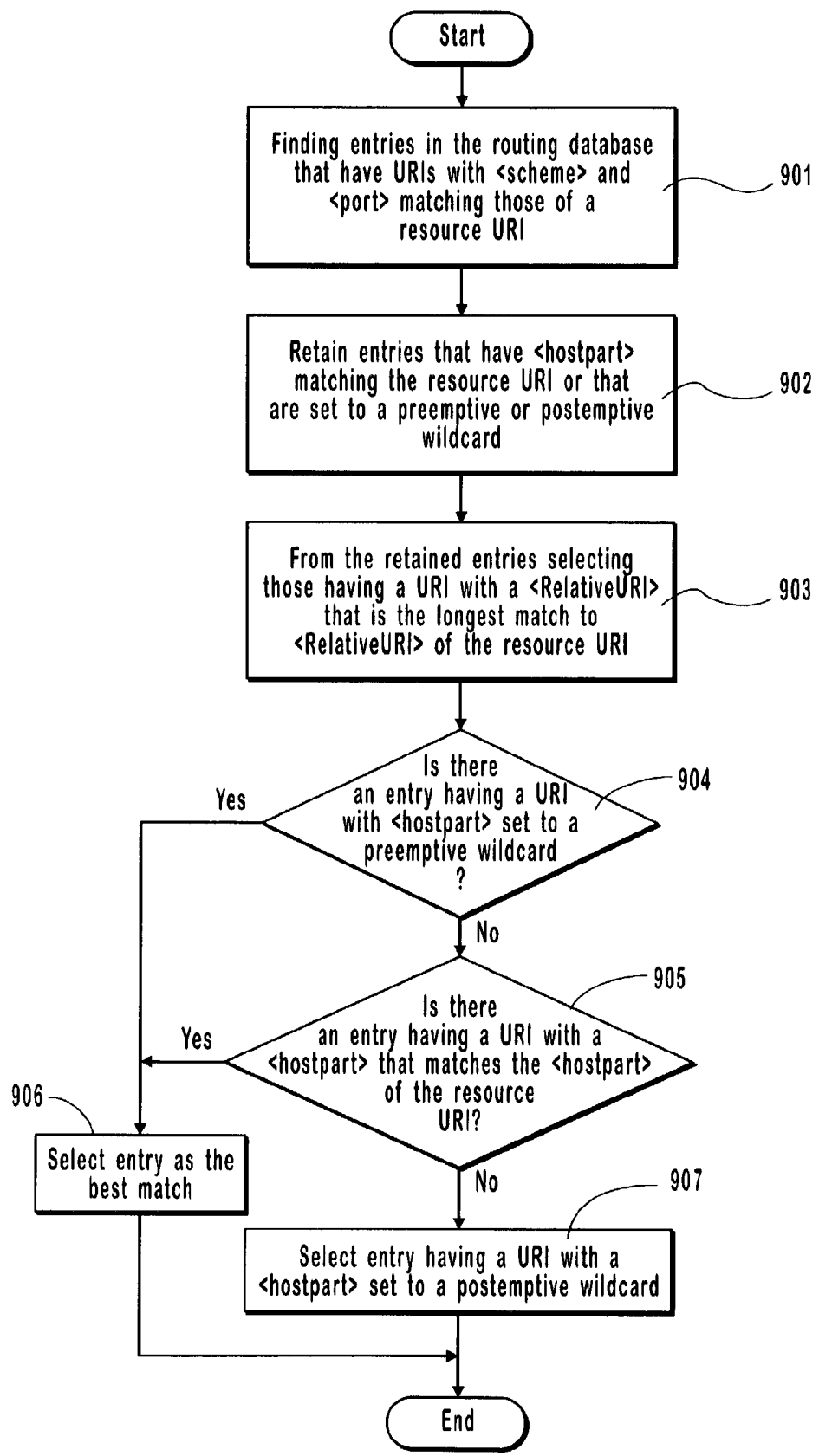
FIG. 9 is a flow diagram illustrating an example of a best match lookup algorithm.

FIG. 9 is a flow diagram illustrating an example of a best match lookup algorithm. The method in FIG. 9 begins with an act of finding entries in the routing database that have URIs with <scheme> and <port> components matching the <scheme> and <port> components of a resource URI (act 901). This can include routing module 301 finding registration routing entries that have registration routing URIs with <scheme> and <port> components matching the <scheme> and <port> components of the resource URI received in act 601.

The method in FIG. 9 includes an act of retaining entries that have URIs with a <hostpart> component matching the <hostpart> component of the resource URI or set to a preemptive or postemptive wildcard (act 902). For example, an entry with a URI of http://site1.com:80/root/dir2 may be retained for the resource URI http://site1.com:80/root /dir2/subdir3. Likewise, an entry with a URI of http://+:80/root may be retained for the resource URI http://site1.com:80/root/dir2/subdir3. However, an entry with a URI of http://site2.com:80/root/dir2 would not be retained for the resource URI http://site1.com:80/root/dir2/subdir3

The method in FIG. 9 includes an act of, from the retained entries, selecting those having a URI with a <RelativeURI> component that is the longest match to the <RelativeURI> component of the resource URI (act 903). As previously described, a longer match may be a match that has increased textual similarity and may identify a portion of a URI namespace that is further removed from the root of the URI namespace. For any resource URI there may be a number of entries having a URI with a <RelativeURI> component that is a longest match. There may an entry having a URI with a matching <hostpart> component, an entry having a URI with a <hostpart> of a preemptive wildcard, and a entry having a URI with a <hostpart> of a postemptive wildcard. For example, entries with each of following URIs http://www.site3.com:80/root/dir1/subdir2, http://+:80/root/dir1/subdir2, and http://*:80/root/dir1/subdir2 can be viewed as a longest match for the resource URI http://www.site3.com:80/root/dir1/subdir2.

At decision block 904 it is determined if there is an entry having a URI with a <hostpart> set to a preemptive wildcard.

When there is an entry having a URI with a <hostpart> set to a preemptive wildcard (YES at decision block 904), this entry is selected as the best match (act 906) However, when there is not an entry having a URI with a <hostpart> set to a preemptive wildcard (NO at decision block 904), it is determined at decision block 905 if there is an entry having a URI with a <hostpart> component that matches the <hostpart> component of the resource URI.

When there is an entry having a URI with a <hostpart> component that matches the <hostpart> component of the resource URI (YES at decision block 905), this entry is selected as the best match (act 906). However, when there is not an entry having a URI with a <hostpart> component that matches the <hostpart> component of the resource URI (NO at decision block 905), an entry having a URI with a <hostpart> set to a postemptive wildcard is selected as the best match (act 907).

The method in FIG. 6 may include a functional, result-oriented step for checking permissions associated with a reservation routing entry to determine if a resource request should be routed to a registration routing entry (step 606). Step 606 may be performed so as reduce the chances of routing data requests to an unauthorized process. Step 606 may include any corresponding acts for accomplishing the result of checking permissions associated with a reservation routing entry to determine if a resource request should be routed to a registration routing entry.

However, in the illustrated example of FIG. 6, the step 606 includes a corresponding act of identifying a reservation entry that best matches the resource request (act 603). As illustrated in FIG. 3 by the arrow labeled "Identify Best Matches," routing module 301 may identifying a best matching reservation routing entry from routing database 302. Routing module 301 may access reservation routing entries 304 via logical communication link 305 to identify a best matching registration routing entry.

Routing database 302 contains a number of reservation routing entries, such as, for example, reservation routing entries 334 and 344, collectively labeled as reservation routing entries 304. Each reservation routing entry included in reservation routing entries 303 may have a reservation routing URI and a corresponding reservation routing ACL. For example, reservation routing entry 334 has reservation routing URI 335 and corresponding reservation routing ACL 336. A reservation routing URI identifies a URI namespace and a corresponding reservation routing ACL includes permissions associated with the URI namespace identified by the reservation routing URI. A reservation routing ACL may include permissions indicating the users and/or processes that are permitted to register the URI namespace identified by the reservation routing URI.

Routing module 301 may add reservation routing entries to routing database 302 at the time routing module 301 begins operation. Routing module 301 may access each entry in a reservation store, such as, for example, reservation store 204 in FIG. 2, and add a corresponding reservation routing entry to routing database 302. Appropriate commands can be included in configuration files to cause routing module 301 to automatically begin operation during computer system 300's transition into a functional state, such as, for example, after initially receiving power or being rebooted. Further, user commands received at computer system 300 as a result of manipulating an input device, such as, for example, a keyboard, may cause routing module 301 to begin or end operation. Routing module 301 can also add a corresponding reservation routing entry to routing database 302 when a reservation entry is added to reservation store 204 after routing module 301 has become operational.

Identifying a reservation routing entry that is the best match to a resource request can include identifying components of a reservation routing URI that are similar to components of a resource URI. In some embodiments, a best match algorithm, such as, for example, the best match algorithm described in FIG. 9 is utilized to identify a reservation routing entry that is the best match to a resource request.

In the illustrated example of FIG. 6, the step 606 also includes a corresponding act of determining that the reservation entry is a better match to the resource request than the registration entry (act 604). A reservation routing entry can be viewed as a better match when the <RelativeURI> component of a reservation routing URI is a longer textual match to the <RelativeURI> component of a resource URI than the <RelativeURI> component of a registration routing URI. For example, the reservation routing URI http://+:80/root/dir4 can be viewed as a better match to the resource URI http://www.site4.com:80/root/dir4/subdir than the registration routing URI http://www.site4.com:80/root/. This is because the <RelativeURI> component of /root/dir4 is a longer textual match to the <RelativeURI> component /root/dir4/subdir than the <RelativeURI> component /root. A reservation routing entry may also be viewed as a better match when the <RelativeURI> component of a reservation routing URI and the <RelativeURI> component of a registration routing URI are an equal textual match to the <RelativeURI> component of a resource URI.

In the illustrated example of FIG. 6, the step 606 also includes a corresponding act of indicating that the resource request should be routed to the registration routing entry if permissions of the reservation routing entry so indicate (act 605). As illustrated in FIG. 3 by the arrow labeled "Route Resource Request," routing module 301 may route a resource request to registered processes 307 via logical communication link 308. When a reservation routing entry is a better match, this may indicate that a process that should have processed the resource request is not registered and thus is not active. However, if the process registered to receive resource requests for the registration routing URI is also authorized to receive resource requests for the reservation routing URI, resource requests can be dispatched to the registered process. To determine if a process is authorized, the permissions in the reservation routing ACL of the best matching reservation routing entry can be checked.

Referring to FIG. 8, assume routing module 301 has added corresponding reservation routing entries to routing database 302 for each reservation entry in reservation store 800. Further, assume reservation entry 819 has been registered, a registration routing entry added to routing database 302, and that process 318 is receiving requests for the URI namespace http://site1.com:80/. Further, assume that reservation entry 825 has not been registered. Thus, when receiving a resource request with a resource URI of http://site1.com:80/foo it may be determined that the best matching registration routing entry has a registration routing URI of http://site1.com:80/(i.e., the URI corresponding to reservation entry 819). Similarly, it may be determined that the best matching reservation routing entry has a reservation routing URI of http://site1.com:80/foo (i.e., the URI corresponding to reservation entry 825).

To determine if the resource request should be routed to process 318, the reservation routing ACL corresponding to the reservation ACL of reservation entry 825 is checked. If the permissions indicate that process 318 is authorized to receive resource requests for the URI namespace http://site1.com:80/foo, routing module 301 can route the resource request to process 318. However, if the permissions indicate that process 318 is not authorized to receive resource requests for the URI namespace http://site1.com:80/foo, the resource request is not routed to process 318. When a resource request is not routed to a process a message so indicating may be returned to the entity that initiated the resource request.

Figure 4:
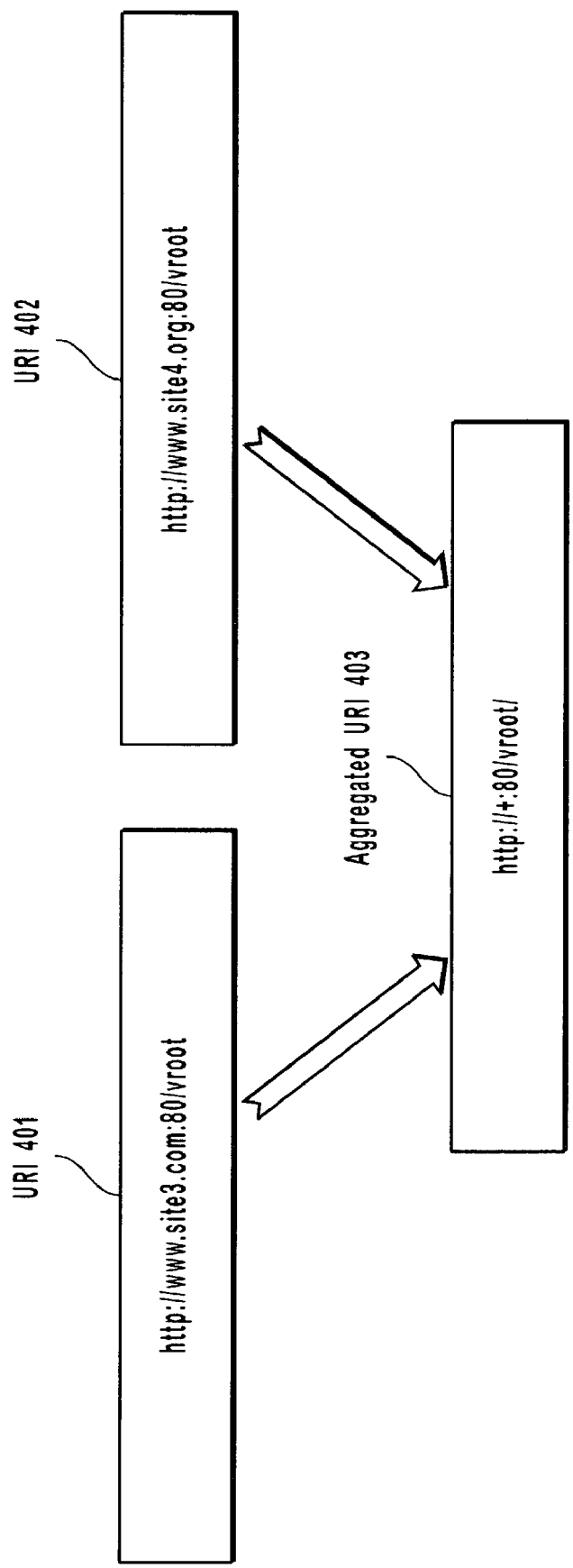
FIG. 4 illustrates an example of URI namespaces that can be aggregated using a preemptive wildcard.
Figure 7:
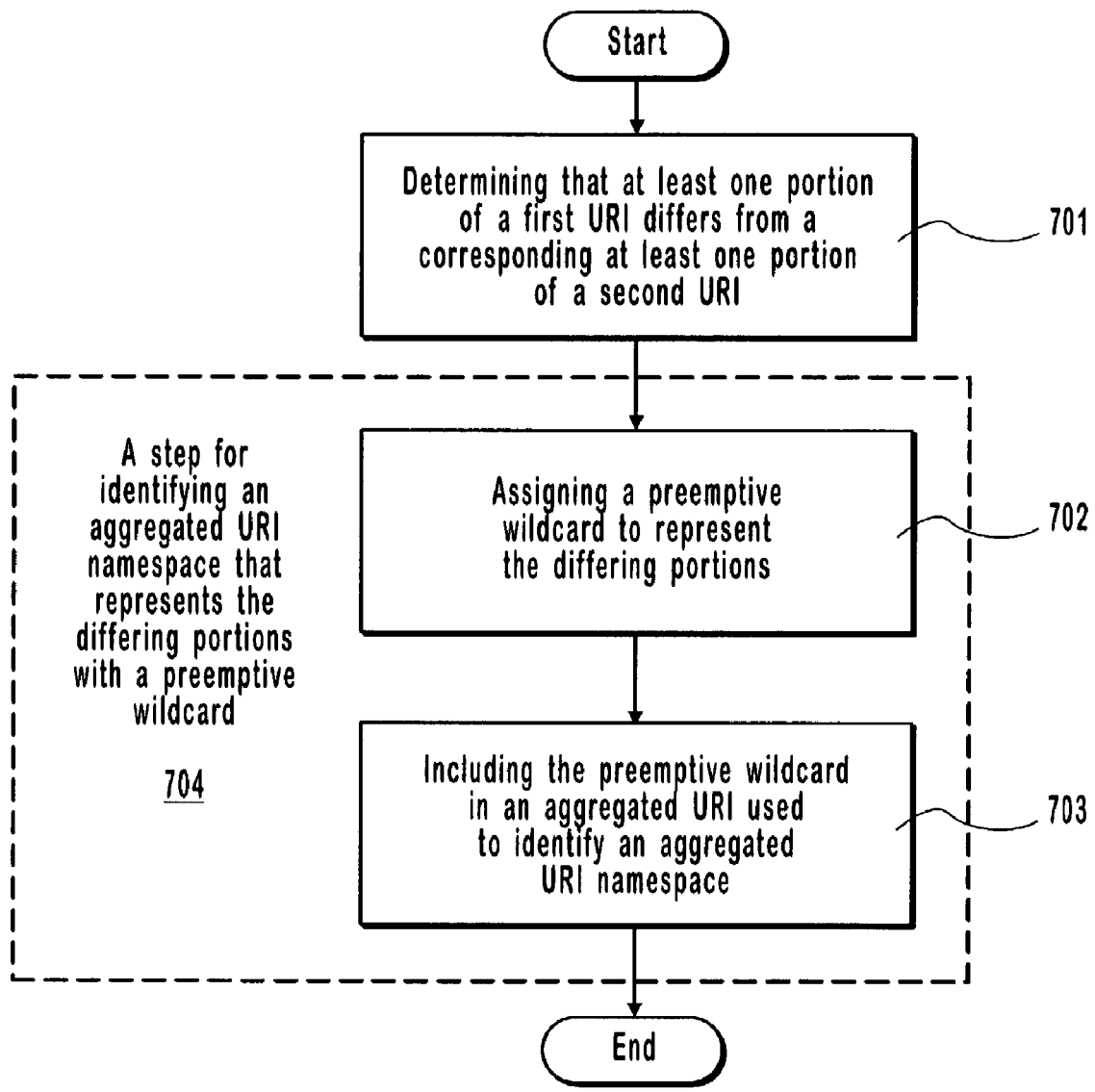
FIG. 7 is a flow diagram illustrating an example of a method for identifying an aggregated URI namespace.

In some embodiments, a preemptive wildcard is utilized to identify an aggregated URI namespace. FIG. 4 illustrates an example of URI namespaces that can be aggregated using a preemptive wildcard. FIG. 7 is a flow diagram illustrating an example of a method for identifying an aggregated URI namespace. The method of FIG. 7 will be discussed with reference to the URI namespaces of FIG. 4.

The method in FIG. 4 begins with an act of determining that at least one portion of a first URI differs from a corresponding at least one portion of a second URI (act 701). FIG. 4 illustrates that the <hostpart> component of URI 401 differs from the <hostpart> component of URI 402.

The method in FIG. 7 may include a functional, result-oriented step for identifying an aggregated URI namespace that represents the differing portions with a preemptive wildcard (step 704). Step 704 may be performed so as to reduce the system resources needed to process resource requests for URI namespaces identified by the first URI and the second URI. Step 704 may include any corresponding acts for accomplishing the result of identifying an aggregated URI namespace that represents the differing portions with a preemptive wildcard. However, in the illustrated example of FIG. 7, the step 704 includes a corresponding act of assigning a preemptive wildcard to represent the differing portions (act 702).

In FIG. 4, a preemptive wildcard is assigned to represent the differing <hostpart> components of URI 401 and URI 402. However, a preemptive wildcard may be assigned to represent any differing portions of the <scheme-specific-part> of URIs. In some URI namespaces this can include differing components, such as, for example, the <port> components or <RelativeURI> components. Furthermore, a preemptive wildcard can be assigned to represent a plurality of differing components. For example, a preemptive wildcard can be used to represent differing URI prefixes of URIs. However, assigning a preemptive wildcard is not limited such components. It would be apparent to one skilled in the art, after having reviewed this description, that a preemptive wildcard can be assigned to represent a wide variety of differences in the <scheme-specific-part> of a URIs, in addition to those previously described, for identifying an aggregated namespace.

In the illustrated example of FIG. 7, the step 704 also includes a corresponding act of including the preemptive wildcard in an aggregated URI used to identify an aggregated URI namespace (act 703). As illustrated in FIG. 4, aggregated URI 403 identifies the aggregated namespace http://+:80/vroot/.

A preemptive wildcard can be included in the registration URI of a registration request to register an aggregated URI namespace. Since a match including a preemptive wildcard has priority over a textual match, such registration entries can be used to override existing registration entries in a routing database. The ability to override other registration entries can be particularly beneficial for preventing a registered unauthorized process from receiving resource requests. An administrator that identifies an authorized process can register an aggregated URI namespace to override a prior registration for a URI namespace associated with the unauthorized process. Further, registering a URI namespace with a preemptive wildcard has a reduced impact on other registered URI namespaces as compared to completely disabling the namespace management module or removing power from a computer system.

In some embodiments, a single namespace management module includes the functionality of registration module 201, routing module 301, and the functionality to identify aggregated namespaces using a preemptive wildcards.

The principles of present invention provide significantly increasing the security of URI namespaces. By utilizing a persistent reservation store of reservation URIs and reservation ACLs the chances of an unauthorized process gaining the functionality to receive resource requests (i.e., registering) for a URI namespace are significantly reduced. Further, even if an unauthorized process somehow becomes registered the unauthorized process may be prevented from receiving resource requests due to reservation routing entries included in a routing database. Also, when an unauthorized process is detected as being registered for a URI namespace, an administrator may override the registration of the unauthorized process by registering an aggregated URI namespace with a preemptive wildcard.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a computer system that is communicatively coupled to a routing database, wherein the routing database contains one or more routing entries, each routing entry indicating a URI in a URI namespace and a corresponding registered process that has registered to accept resource requests sent to the URI, and wherein the routing database contains one or more reservation entries, each reservation entry indicating a portion of the URI namespace and corresponding security permissions for that portion of the URI namespace a method for appropriately routing a resource request in accordance with security permissions for the URI namespace, the method comprising:

an act of receiving a resource request that includes a requesting URI, the requesting URI contained in the URI namespace;

an act of identifying a routing entry having a registered URI that best matches the requesting URI, the routing entry identifying a process that has registered to accept resource requests sent to the registered URI;

an act of identifying a reservation entry that best matches the registered URI, the reservation entry corresponding to a portion of the URI namespace that contains the registered URI, the reservation entry including security permissions indicating processes that are permitted to register to accept resource requests sent to the registered URI;

an act of determining how to route the resource request based on the contents of one or security permissions included in the reservation entry such that if the process is permitted to register to accept resource requests sent to the registered URI then the received resource request is routable to the process; and an act of routing the resource request in accordance with the one or more security permissions included in the reservation entry.

2. The method as recited in claim 1, wherein the act of receiving a resource request comprises the following:

an act of receiving a requesting URL identifying a resource within a URL namespace.

3. The method as recited in claim 1, wherein the act of identifying a routing entry having a registered URI that best matches the requesting URI comprises the following:

an act of a best match lookup algorithm identifying a routing entry that best matches the resource request.

4. The method as recited in claim 3, wherein the act of a best match lookup algorithm identifying a routing entry that best matches the resource request comprises the following:

an act of identifying routing entries with registered URIs having a <scheme> component that matches the <scheme> component of a requesting URI included in the resource request.

5. The method as recited in claim 3, wherein the act of a best match lookup algorithm identifying a routing entry that best matches the resource request comprises the following:

an act of identifying routing entries with registered URIs having a <port> component that matches the <port> component of a requesting URI included in the resource request.

6. The method as recited in claim 3, wherein the act of a best lookup algorithm identifying a routing entry that best matches the resource request comprises the following:

an act of identifying routing entries with registered URIs having a <hostpart> component that matches the <hostpart> component of a requesting URI included in the resource request.

7. The method as recited in claim 3, wherein the act of a best lookup algorithm identifying a routing entry that best matches the resource request comprises the following:

an act of identifying routing entries with registered URIs having a <hostpart> set to a preemptive wildcard.

8. The method as recited in claim 3, wherein the act of a best lookup algorithm identifying a routing entry that best matches the resource request comprises the following:

an act of selecting registered URIs having <RelativeURI> components that are a longer match to a <RelativeURI> component of a requesting URI.

9. The method as recited in claim 1, wherein the act of identifying a reservation entry that best matches the registered URI comprises the following:

an act of a best match lookup algorithm identifying a reservation entry that best matches the registered URI.

10. The method as recited in claim 1, wherein the act of determining how to route the resource request based on the contents of one or more security permissions comprises an act of referring to an Access Control List associated with a persistent reservation store.

11. The method as recited in claim 1, wherein the act of routing the resource request in accordance with the one or more security permissions included in the reservation entry comprises an act of routing the resource request to the process identified in the routing entry.

12. The method as recited in claim 1, wherein the act of routing the resource request in accordance with the one or more security permissions included in the reservation entry comprises an act of indicating that the resource request should not be routed to the process identified in the routing entry based on the one or more security permissions indicating that the process identified in the routing entry is not permitted to register to accept resource requests sent to the registered URI.

13. A computer program product for use in a computer system that is communicatively coupled to a routing database, wherein the routing database contains one or more routing entries, each routing entry indicating a URI in a URI namespace and a corresponding registered process that has registered to accept resource requests sent to the URI, and wherein the routing database contains one or more reservation entries, each reservation entry indicating a portion of the URI namespace and corresponding security permissions for that portion of the URI namespace, the computer program product for implementing a method for appropriately routing a resource request in accordance with security permissions for the URI namespace, the computer program product comprising the following:

one or more computer-readable media carrying computer-executable instructions, that when executed at the computer system, cause the computer system to perform the method, including:

receiving a resource request that includes a requesting URI, the requesting URI contained in the URI namespace;

identifying a routing entry having a registered URI that best matches the requesting URI, the routing entry identifying a process that has registered to accept resource requests sent to the registered URI;

identifying a reservation entry that best matches the registered URI, the reservation entry corresponding to a portion of the URI namespace that contains the registered URI, the reservation entry including security permissions indicating processes that are permitted to register to accept resource requests sent to the registered URI;

determining how to route the resource request based on the contents of one or security permissions included in the reservation entry such that if the process is permitted to register to accept resource requests sent to the registered URI then the received resource request is routable to the process; and routing the resource request in accordance with the one or more security permissions included in the reservation entry.

14. The computer program product as recited claim 13, wherein the one or more computer-readable media are physical storage media.

15. The computer program product as recited claim 13, wherein the one or more computer-readable media are system memory.

16. In a computer system that is communicatively coupled to a routing database, wherein the routing database contains one or more registration routing entries that each have a registration routing URI and one or more reservation routing entries that each have a reservation routing URI and one or more permissions, a method for determining how to route a resource request so as to increase the security associated with routing resource requests, the method comprising:

an act of receiving a resource request for a URI namespace;

an act of identifying a registration routing entry that best matches the resource request, including:

selecting registration routing URIs having <RelativeURI> components that are a longer match to a <RelativeURI> component of a resource URI;

identifying a registration routing URI having a <hostpart> component set to a preemptive wildcard, if a registration routing URI having a <hostpart> component set to a preemptive wildcard was selected as one of the registration routing URIs having <RelativeURI> components that are a longer match to a <RelativeURI> component of a resource URI;

when a registration URI having a <hostpart> component set to a preemptive wildcard is not identified, identifying a registration routing URI having a <hostpart> component that matches the <hostpart> component of a resource URI, if a registration routing URI having a <hostpart> component that matches the <hostpart> component of a resource URI was selected as one of the registration routing URIs having <RelativeURI> components that are a longer match to a <RelativeURI> component of a resource URI; and when a registration URI having a <hostpart> component set to a preemptive wildcard is not identified and when a registration routing URI having a <hostpart> component that matches the <hostpart> component of a resource URI is not identified, identifying a registration routing URI having a <hostpart> component set to a postemptive wildcard, if a registration routing URI having a <hostpart> component set to a postemptive wildcard was selected as one of the registration routing URIs having <RelativeURI> components that are a longer match to a <RelativeURI> component of a resource URI;

an act of identifying a reservation routing entry that best matches the resource request;

an act of determining that the reservation routing entry is a better match than the registration entry; and an act of indicating that the resource request should be routed to a registered process associated with the registration routing entry if the one or more permissions of the reservation routing entry so permit.

* * * * *